UNITED STATES PATENT OFFICE.

JÜRGEN CALLSEN, OF ELBERFELD, GERMANY, ASSIGNOR TO SYNTHETIC PATENTS CO., INC., OF NEW YORK, N. Y., A CORPORATION OF NEW YORK.

BROMODIETHYLACETYLURETHANES.

1,256,293.      Specification of Letters Patent.      Patented Feb. 12, 1918.

No Drawing.      Application filed January 31, 1917. Serial No. 145,781.

*To all whom it may concern:*

Be it known that I, JÜRGEN CALLSEN, doctor of philosophy, chemist, citizen of the German Empire, residing at Elberfeld, Germany, have invented new and useful Improvements in Bromodiethylacetylurethanes, of which the following is a specification.

The present invention concerns the production of the hitherto unknown bromodiethylacetylurethanes of N-acylized aminophenols having most probably the following general formula:

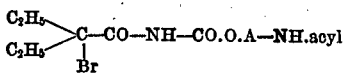

A stands for an arylene radical; acyl means an acid group, *e. g.* $CH_3CO$; $NH_2$—$CO$—, etc.

The new products are generally whitish compounds which can be crystallized from alcohol. They have proved to be valuable nervines and sedatives, an average dose being from ¼ to ½ gram. Upon being heated over their melting point HBr is split off. A process for their production consists in reacting upon the acidylized aminophenol with bromodiethylacetylisocyanate:

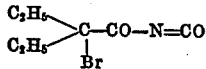

In order to illustrate my new process more fully the following example is given, the parts being by weight: 453 parts of para-acetylaminophenol are suspended in 1500 parts of pure acetone, 660 parts of bromodiethylacetylisocyanate are added and the mixture is shaken until solution results. After the latter has been allowed to stand during some hours the precipitate is filtered off, washed with ether and recrystallized from alcohol. It crystallizes in the shape of small white leaflets melting at 144° C. The new product has most probably the following formula:

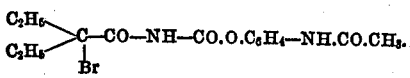

It is almost tasteless, easily soluble in alcohol and acetone, scarcely soluble in benzene, ether and water. Other acidylized aminophenols can be used. The bromodiethylacetylurethane of the oxyphenylurea melts at 187° C. It has most probably the formula:

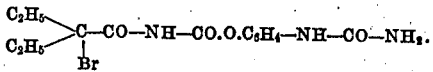

For the purpose of this patent it is to be assumed that any products which may be obtained by treating the above mentioned N-acidylized aminophenols according to methods suitable for the manufacture of their bromodiethylacetylurethanes is within the class designated in this patent as such urethanes of facidylized aminophenols, such being in accordance with my present understanding as a chemist and such being the intended generic scope of this patent.

I claim:—

1. The herein described bromodiethylacetylurethanes, having most probably the following general formula:

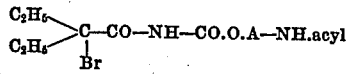

in which A represents an arylene radical, being generally whitish compounds which can be crystallized from alcohol; to splitting off hydrogen bromid when heated beyond their melting point; and being valuable nervines and sedatives, substantially as described.

2. The herein described bromodiethylacetylurethanes, having most probably the following formula:

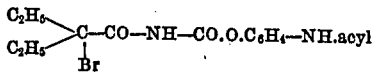

being generally whitish compounds which can be crystallized from alcohol; splitting off hydrogen bromid when heated beyond their melting point; and being valuable nervines and sedatives, substantially as described.

3. The herein described bromodiethylacetylurethane of paraacetylaminophenol having most probably the following formula:

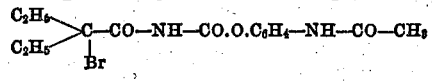

crystallizing from alcohol in the shape of small white leaflets melting at 144° C., being almost tasteless, easily soluble in alcohol and acetone, scarcely soluble in benzene, ether and water; and being a valuable nervine and sedative, substantially as described.

In testimony whereof I have hereunto set my hand in the presence of two subscribing witnesses.

JÜRGEN CALLSEN. [L. S.]

Witnesses:
HELEN NUFER,
FRANCES M. NUFER.